INVENTORS
RICHARD G. POPOVICI
LAWRENCE ROSENBERG
BY
Lawrence S. Epstein
ATTORNEYS INVENTORS
RICHARD G. POPOVICI
LAWRENCE ROSENBERG
BY
*Lawrence S. Epstein*
ATTORNEYS

3,532,798
ATTENUATOR

Richard G. Popovici, Wayne, and Lawrence Rosenberg, Fair Lawn, N.J., assignors, by mesne assignments, to the United States of America as represented by the Secretary of the Navy
Filed Oct. 25, 1963, Ser. No. 319,079
Int. Cl. G01b 9/00; G01s 9/00
U.S. Cl. 35—10.4                           1 Claim This invention relates to simulator systems and is particularly directed towards an improved simulator circuit utilizing gate signals for controlling the magnitude and width of simulated audio signals for use in a sonar trainer.

Operational sonar sets utilize both video and audio signals for detection and identification of targets. Sonar sets can be unidirectional, multidirectional or scanning types. During operation of sonar equipment, the scanning type of sonar is utilized to search for targets over a particular sector or over 360°. Operational scanning types of sonar equipment also provide continuous controllable scan over a narrow width sector. When the signals received by the scanning type sonar equipment are recorded and utilized for subsequent training of personnel or when sonar signals are simulated in training devices and applied to operational equipment for training purposes, it is necessary to provide realistic simulation of received signals. When a multiplicity of signals are simulated, these signals are discrete and require some type of combining means to produce a smooth transition between one sector scan and the adjoining sector. The instant invention provides such a function.

It is therefore an object of the instant invention to provide a new and improved system for combining two or more input signals and generating an output signal which represents the product of the two input signals.

It is a further object of the instant invention to provide a new and improved system for combining two input voltages by means of a simple electrical circuit having no mechanical moving parts.

Another object of the instant invention is to provide a novel circuit for controlling the magnitude of an electrical signal in accordance with the occurrence of pulse signals.

Figure 1:
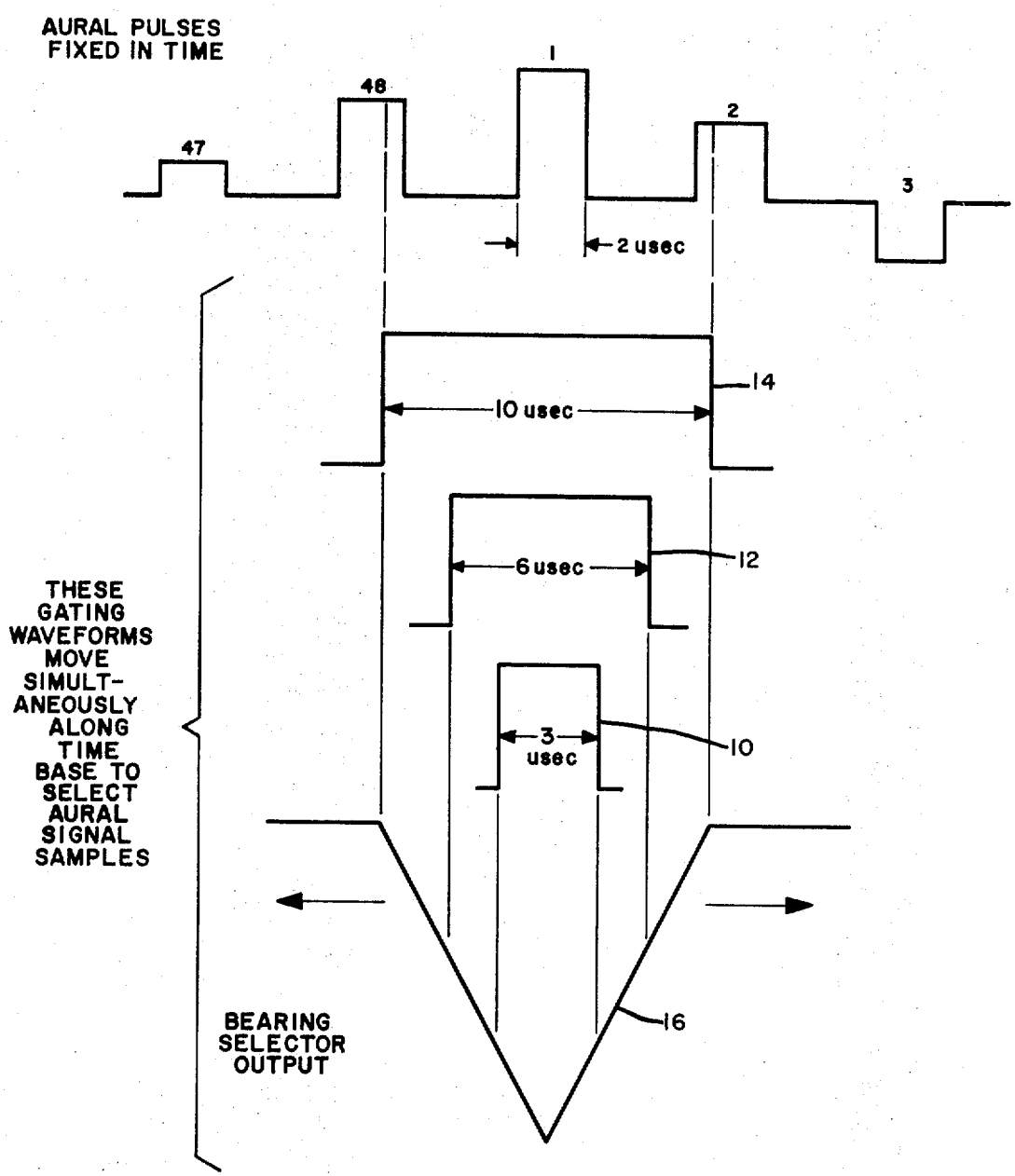
Figure 2:
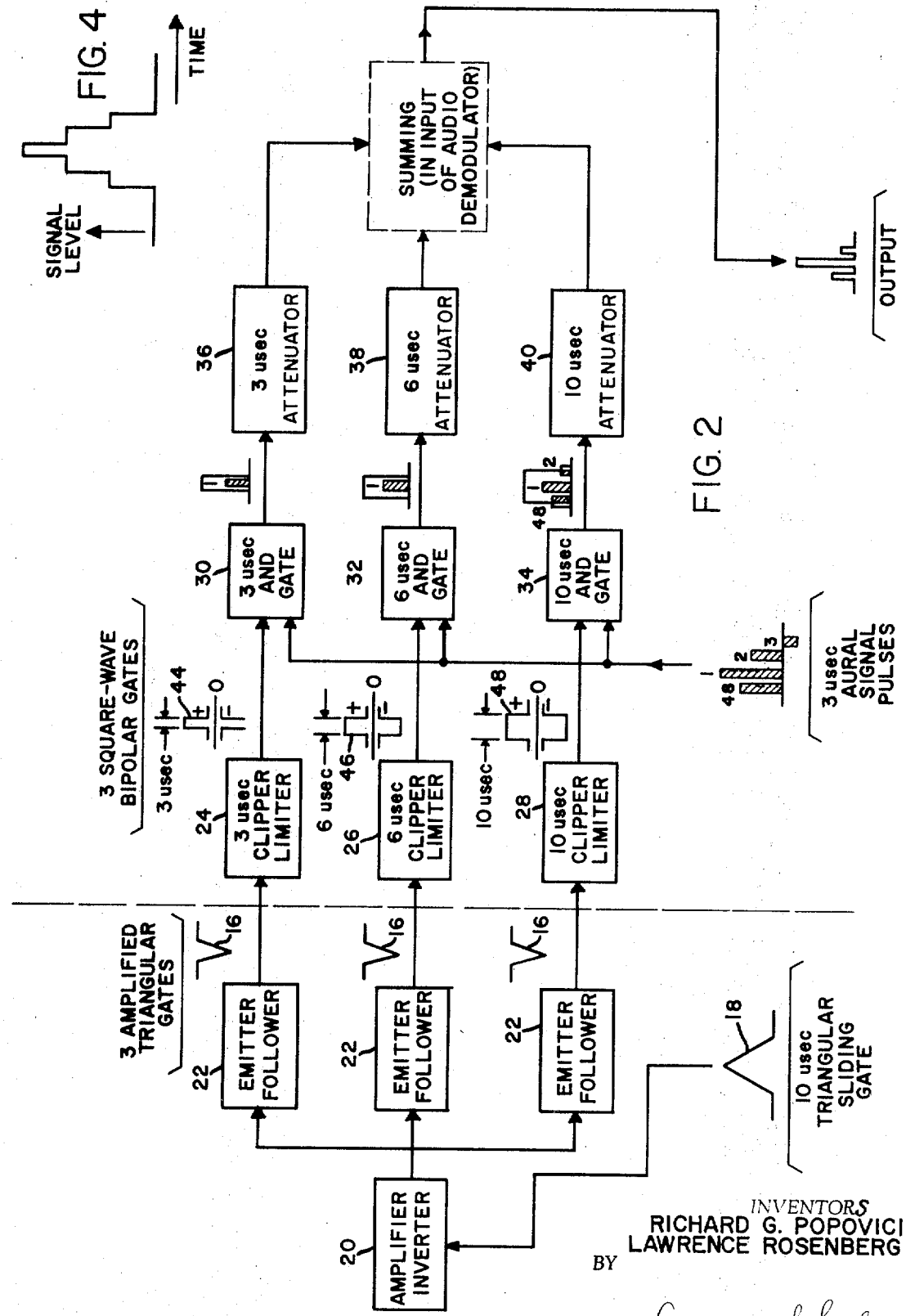
Figure 3:
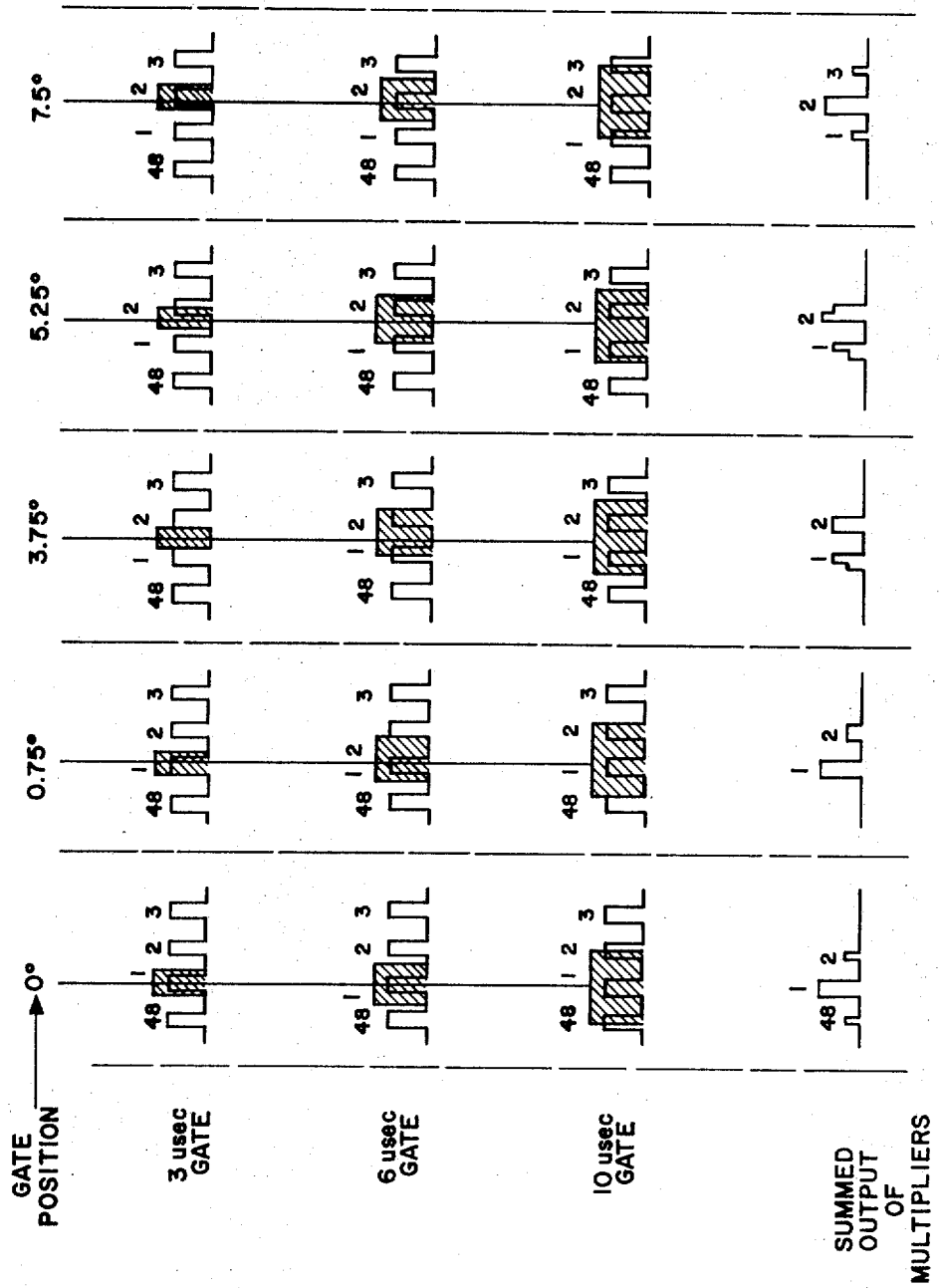
Figure 5A:
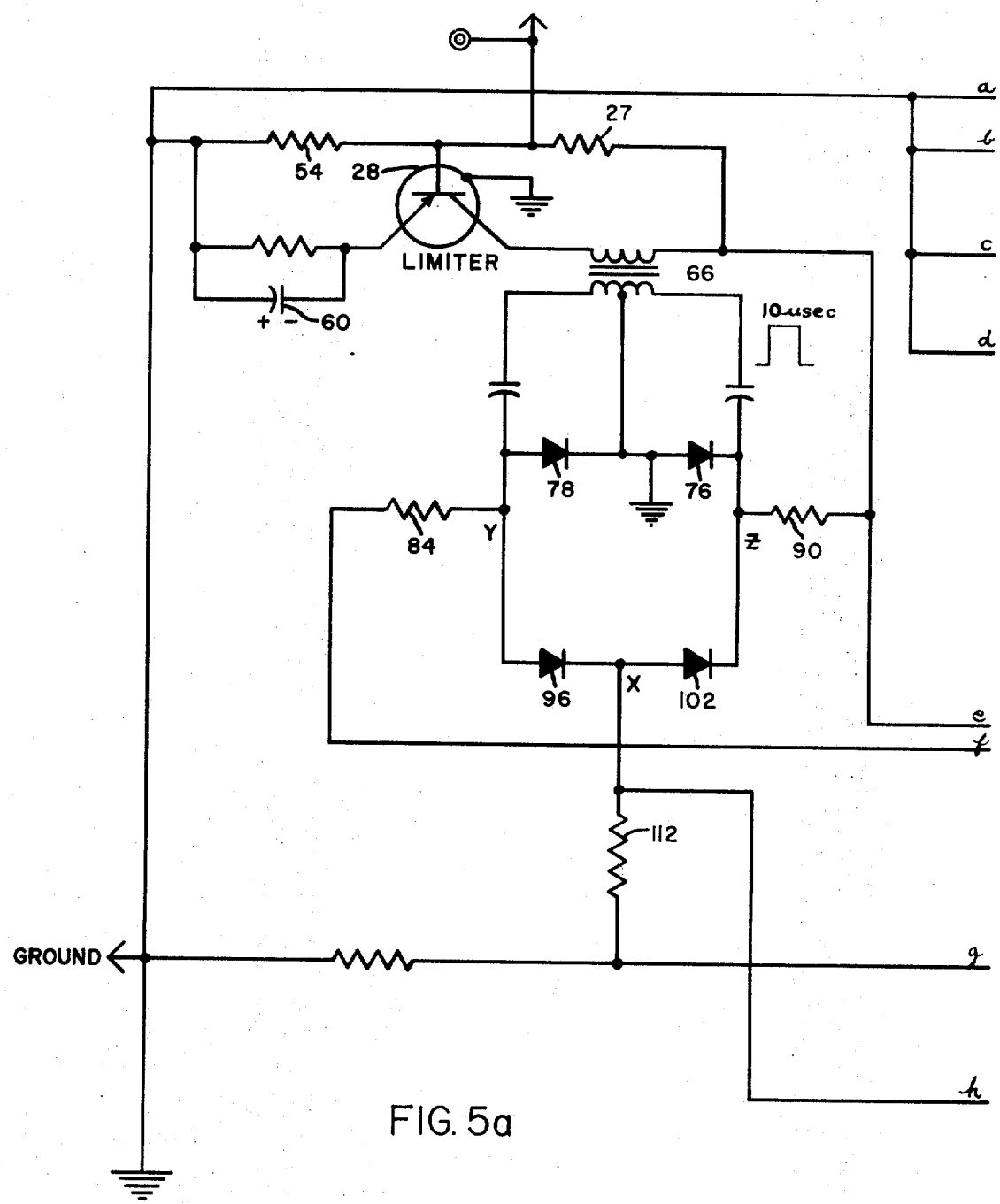
Figure 5B:
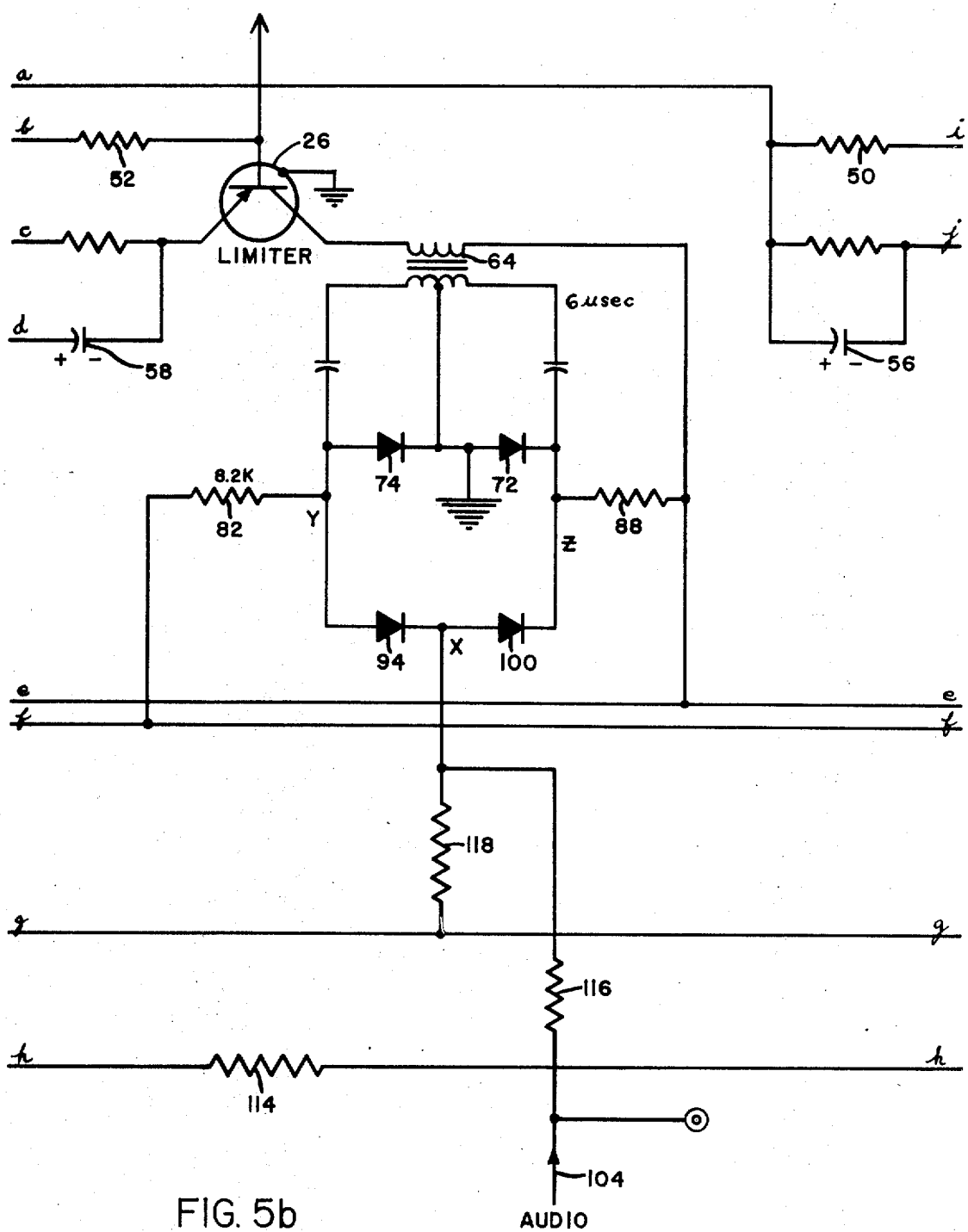
Figure 5C:
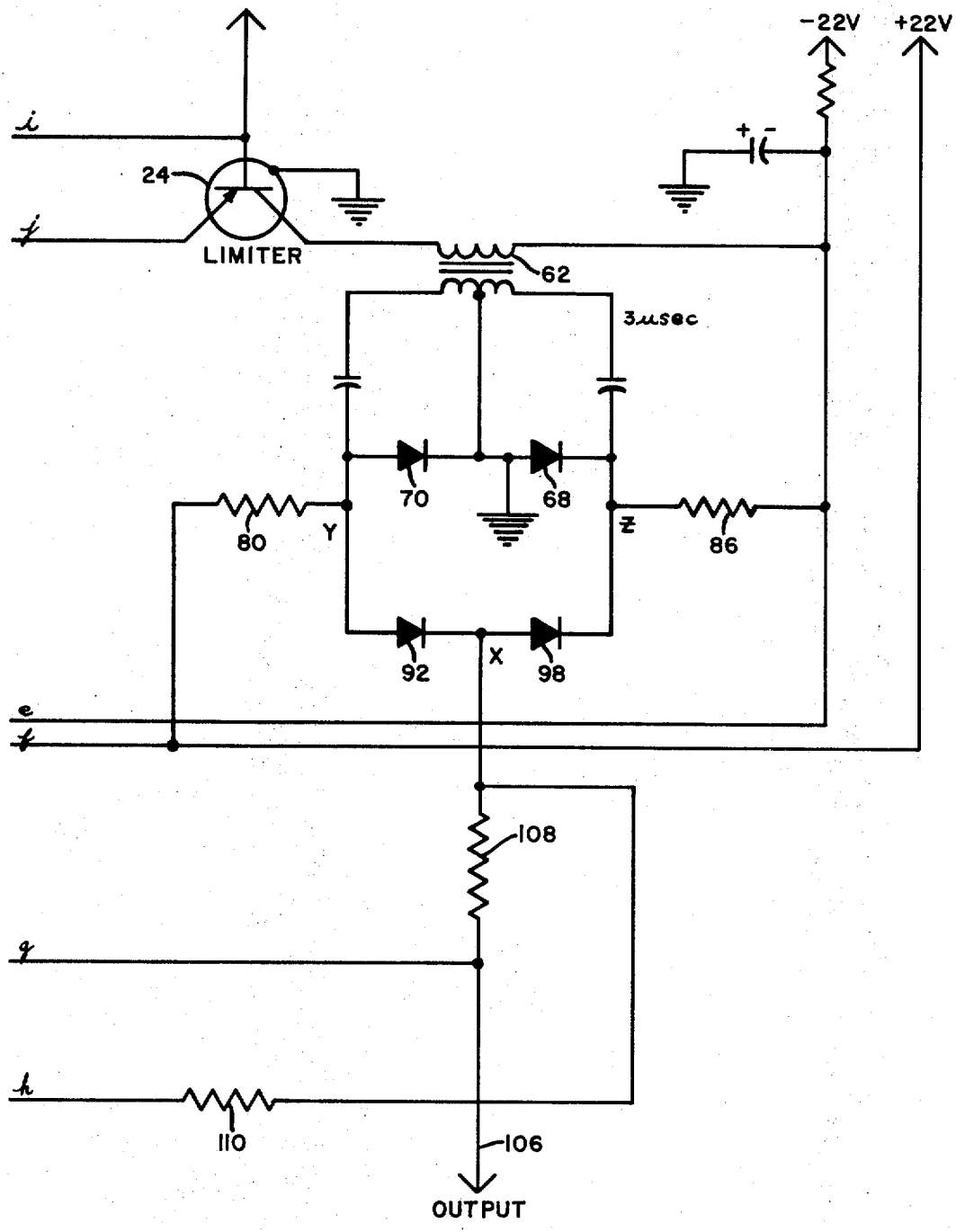

Other objects and many of the attendant advantages of this invention will be readily appreciated as the same becomes better understood by reference to the following detailed description when considered in connection with the accompanying drawings wherein:

FIG. 1 is a diagram of the sliding gate waveforms;
FIG. 2 is a block diagram of the attenuating circuits;
FIG. 3 is a waveform diagram showing the operation of the multiplier circuits;
FIG. 4 is a diagram of the multiplier output envelope; and
FIGS. 5a, 5b, and 5c is a detailed schematic diagram of the overall multiplier circuitry.

Referring now to FIG. 1, rectangular sliding gate signals 3, 6 and 10 microseconds widths, respectively 10, 12 and 14 are generated and timed from a single triangular sliding gate waveform input signal 18. To accomplish the generation of three separate different width rectangular gate signals, a single triangular sliding gate signal 18 is first passed to an amplifier converter stage 20. The triangular sliding gate is amplified by the amplifier converter and inverted. In this form it is applied to three identical emitter follower stages 22. The outputs from these stages provide three identical triangular gate signals 16 which are fed to three clipper limiter stages, respectively 24, 26 and 28. The triggering levels of these stages is adjusted to produce the required 3, 6 and 10 microseconds square-wave gating signals 10, 12 and 14. "AND" gates 30, 32 and 34 and three attenuator networks 36, 38 and 40 form part of the multiplier circuitry. The "AND" gates produce an output when two signals are applied which coincide in time. One input to each "AND" gate is one of the square-wave gating signals from clipper limiter stages 24, 26 and 28. The second input is the combined aural signal at point 42 which in this embodiment includes 48 different channels of time division pulse amplitude modulated information. When the triangular sliding gate is moved along the time axis, three square-wave gates 44, 46 and 48 respectively, are produced by the respective clipper limiters 24, 26 and 28 which move in exact coincidence with the triangular gate, scanning the combined aural pulse train which is fixed in relative time. The outputs from the respective "AND" gates are fed to their respective attenuators which are adjusted so that the common output will be approximately the same level as the "AND" gate inputs. When an aural pulse is coincident with all three gates, the common output from the attenuators will be approximately two-thirds of the "AND" gate input level. The common output of the attenuators will be approximately one-third of the "AND" gate input level when an aural pulse is coincident with the 10 microsecond gate only. The summed outputs of the attenuators is shown for five discrete positions of the gates. An infinite number of positions of the gates is possible. A number of different gate positions are shown to illustrate how the transition between the samples is smoothed out. In order to illustrate this point it is assumed that the incoming samples of the aural signals are all of the same magnitude and are constant during the period of the sliding gate actions. This does not necessarily have to be true in actual operation due to the fact that the sampling rate is not coincident with the frequency of the aural signals. In fact, if they were coincident, it would be impossible to reconstruct an aural signal from its sample. The gate progression from 0 to 7.5 degrees shows that the samples from the aural return for antenna pattern 1 begin at a maximum and slowly decrease. At the same time samples from antenna pattern 2 begin at a low level and increase to a maximum. The same effect is shown on FIG. 4 which depicts the envelope of an aural pulse (constant in amplitude) as the sliding gate moves past it. The three amplified triangular gates 16 are connected to the bases of clipper limiters 24, 26 and 28 respectively. The base resistors 50, 52 and 54 respectively, form attenuators which adjust the limiter inputs to the magnitudes required for clipping and limiting the signals at the 3, 6 and 10 microseconds levels, as shown. The limiters are biased to conduct under "no signal" conditions at some level below saturation. The three emitters are bypassed with eight-microfarad capacitors 56, 58 and 60 respectively, to provide low alternating current resistance in the emitter circuits.

The 4 kc. triangular gating signals applied to the base terminals drive the limiter transistors into saturation and thus produce square-wave current pulses in the transformer primaries respectively transformers 62, 64 and 66. Transistor 24 produces a rectangular pulse of 3 microseconds duration; transistor 26 produces a rectangular pulse of 6 microseconds duration; and transistor 28 produces a rectangular pulse of 12 microseconds duration. These pulses appear across the secondaries of transformers 62, 64 and 66 respectively; and are applied to the "AND" gates made up of clamping diodes 68 and 70 for the 3-microseconds pulses, diodes 72 and 74 for the 6-microsecond pulses and diodes 76 and 78 for the 10-microsecond pulses. These circuits produce both positive and negative (bipolar) pulses clamped at approximately ground level.

The three "AND" gates are bidirectional which means that they pass the signals of positive and negative polarity.

The 3, 6 and 10 microsecond gating signals recur simultaneously at the 4 kc. rate. They overlap because of the difference in pulse duration. When no gate signal is present, point X of each "AND" gate is effectively at ground potential due to the clamping action of diodes 68, 72 and 76 respectively, and diodes 70, 74 and 78 respectively. Point Y is clamped to 0 potential (neglecting contact potential of diodes 70, 74 and 78 respectively) by the current flowing from the positive 22 volts applied through the associated resistors 80, 82 and 84 respectively, and diodes 70, 74 and 78 respectively to ground. Likewise, point Z of each "AND" gate is clamped to 0 potential by the current flowing from ground through diodes 68, 72 and 76 respectively, and resistors 86, 88 and 90 respectively to the negative 22 volts applied. At this time, if a positive signal were to appear at point X, current would flow through diodes 92, 94 and 96 respectively, thus grounding the signal. If a negative signal were to appear at point X, current would flow through diodes 98, 100 and 102 respectively, thus grounding the signal. Under these conditions it can be seen that no signal will appear at the output.

When gate pulses are produced across the transformer the polarity is such to back bias diodes 68–70, 72–74 and 76–78 respectively, thereby ungrounding point X and allowing current to flow. This action allows the aural signal input connected at point 104 to be coupled out, and output voltage then appears at point 106. The magnitude and duration of this voltage depends upon the time relation of the aural pulses with respect to the gating pulses. This is illustrated in detail in FIG. 3 for variations of the sliding gate positions during a change in bearing.

The output of the "AND" gates are connected to three attenuators made up of resistor 110, resistor 108 and an external summing resistor at point 106 for the 3-microsecond sliding gate; resistors 116, 118 and the external summing resistor at point 106 for the 6-microsecond sliding gate; and resistors 114 and 112 and the external summing resistor at point 106 for the 10-microsecond sliding gate. The networks are so proportioned that a given aural pulse appearing across the summing resistor at point 106 is a minimum or one-third of full voltage when only the 10-microsecond gates are open; it is two-thirds when the 10 and 6 microsecond gates are open and is three-thirds or full voltage when the 10, 6 and 3 microsecond gates are open.

Thus, it is seen by the use of very simplified circuitry a circuit is provided with three channels in the preferred embodiment of the invention described above to produce a pulse-controlled attenuation of signals.

Obviously many modifications and variations of the present invention are possible in the light of the above teachings. It is therefore to be understood that within the scope of the appended claims the invention may be practiced otherwise than as specifically described.

What is claimed is:
1. In a pulse voltage controlled circuit for use in a simulator device supplied with a triangular gate signal, comprising;
   means for generating square wave pulses, including at least two square wave pulse generating means, comprising
      a three microsecond clipper limiter,
      a six second microsecond clipper limiter,
      and a ten microsecond clipper limiter, each of said clipper limiters having an identical triangular gate signal applied thereto where each of said clipper limiters operate and generate a different width square wave signal centered about said input triangular gate signal,
   gate means, including at least two gating means, said gate means being operatively connected to said square wave pulse generator means whereby input signals to said gate means are gated in coincidence with square wave signal pulse outputs from said square wave pulse generating means, and each of said gating means comprising,
      a three microsecond "AND" gate operable with said three microsecond clipper limiter,
      a six microsecond "AND" gate operable with said six microsecond clipper limiter, and a
      ten microsecond "AND" gate operative with said ten microsecond clipper limiter,
      and each of said gating means having a common input for aural signals, whereby said aural signals are passed through said gating means on coincidence of said input aural signals and their respective square wave output of respective clipper limiters,
   signal attenuator means, said signal attenuator means being operatively connected to the output of said gating means for attenuating the magnitudes of signals gated thereby, each of said attenuators comprising,
      a respective three microsecond attenuator operable with said three microsecond "AND" gate,
      a six microsecond attenuator operated with said six microsecond "AND" gate, and a
      ten microsecond attenuator operable with said ten microsecond "AND" gate, and
      summing means, said summing means being operatively connected to the outputs of each of said signal attenuator means for summing said attenuator outputs.

References Cited

UNITED STATES PATENTS

| | | | |
|---|---|---|---|
| 3,017,109 | 1/1962 | Briggs | 332—9 |
| 2,980,765 | 4/1961 | Holloway | 325—38 |

RICHARD A. FARLEY, Primary Examiner

T. H. TUBBESING, Assistant Examiner